United States Patent [19]
Hasegawa et al.

[11] Patent Number: 6,055,957
[45] Date of Patent: May 2, 2000

[54] FUEL INJECTION CONTROL METHOD USING VARIABLE NOZZLE HOLE FUEL INJECTION NOZZLE

[75] Inventors: Toshiyuki Hasegawa; Takao Iwasaki; Shoichi Kido, all of Saitama-ken, Japan

[73] Assignee: Zexel Corporation, Tokyo, Japan

[21] Appl. No.: 08/991,226

[22] Filed: Dec. 16, 1997

[30] Foreign Application Priority Data

Dec. 24, 1996 [JP] Japan ................................. 8-355655

[51] Int. Cl.[7] ........................................... F02B 5/00
[52] U.S. Cl. ..................... 123/305; 123/497; 239/533.12
[58] Field of Search ................................... 123/496, 305; 239/533.1, 533.12, 533.4, 533.3

[56] References Cited

U.S. PATENT DOCUMENTS

| | | | |
|---|---|---|---|
| 4,339,080 | 7/1982 | Kopse | 239/533.3 |
| 4,658,824 | 4/1987 | Scheibe | 239/533.4 |
| 5,392,745 | 2/1995 | Beck | 123/305 |
| 5,497,743 | 3/1996 | Clarke | 123/305 |
| 5,551,391 | 9/1996 | Beck | 123/305 |
| 5,645,225 | 7/1997 | Hasegawa | 239/533.12 |
| 5,743,243 | 4/1998 | Yanagihara | 123/305 |
| 5,823,161 | 10/1998 | Potz | 123/305 |
| 5,927,612 | 7/1999 | Cooke | 239/533.12 |

FOREIGN PATENT DOCUMENTS

| | | |
|---|---|---|
| 59-180063 | 10/1984 | Japan . |
| 4-76266 | 3/1992 | Japan . |

*Primary Examiner*—Carl S. Miller
*Attorney, Agent, or Firm*—Michael J. Striker

[57] ABSTRACT

A method for carrying out fuel injection using a variable nozzle hole type fuel injection nozzle and a jerk type fuel injection pump. The variable nozzle hole type fuel injection nozzle has in its tip a well formed by an enclosing wall in which are provided a number of nozzle holes (35). A rotary valve (7) rotatable by an actuator (9) is disposed in the well and has fuel passages (73) so provided in the same number as the nozzle holes (35) that the fuel passages (73) can be connected with the nozzle holes (35) to a degree which varies with the angle of the rotary valve (7). A non-injection period in the rotation of the jerk type fuel injection pump B is detected using an encoder pulse and when the jerk type fuel injection pump B is rotating at high speed the angle of the rotary valve (7) is changed in steps until the rotary valve (7) reaches a target angle (θD) corresponding to a required nozzle hole area by the actuator (9) being driven a required number of times only in the non-injection period.

6 Claims, 10 Drawing Sheets

FIG.2-A
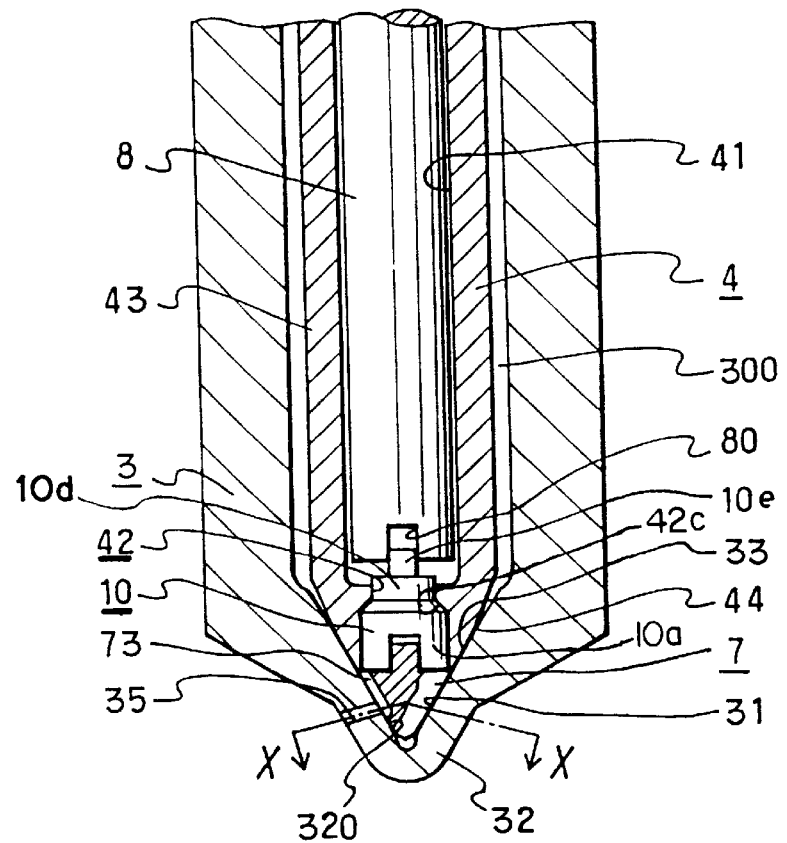
FIG.2-B
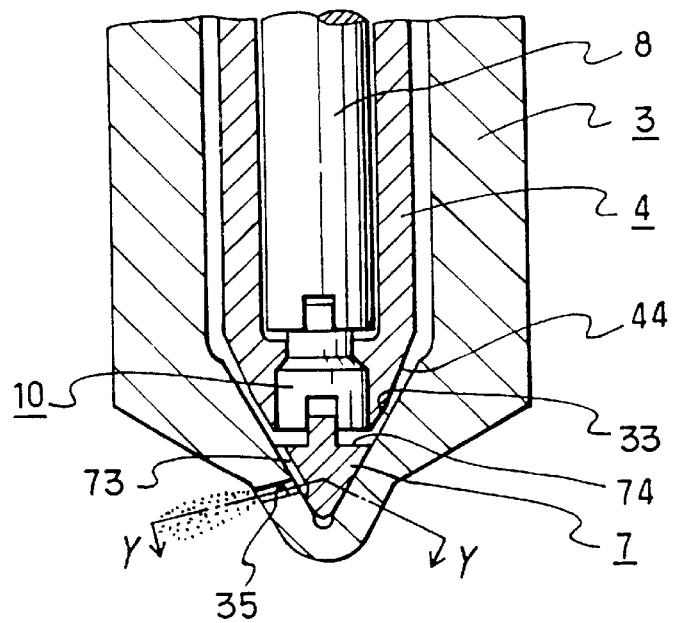

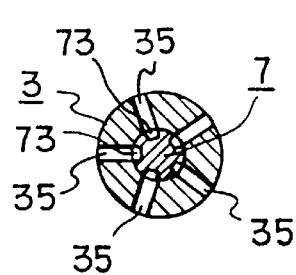
FIG.3-A
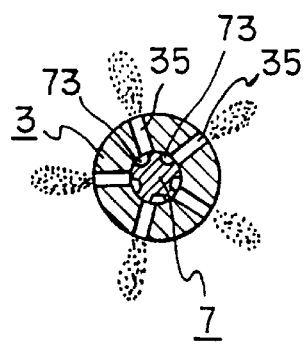
FIG.3-B
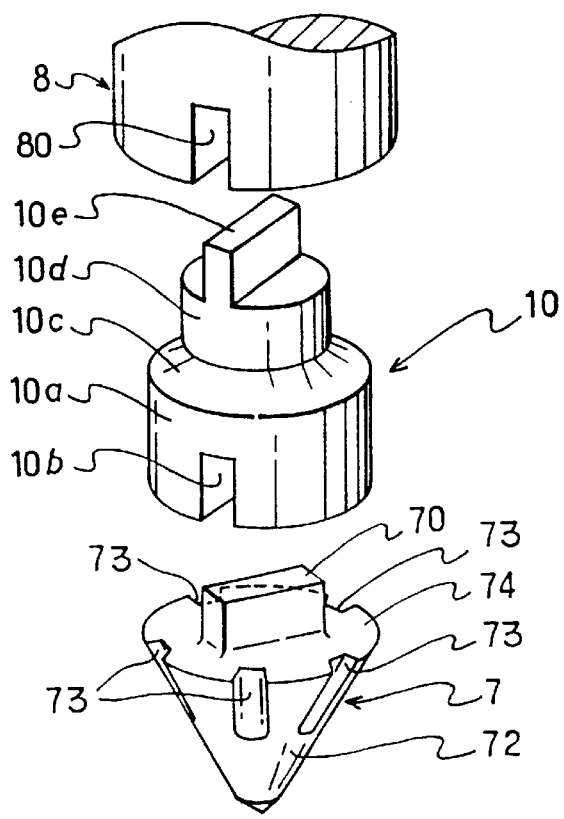
FIG.4-A
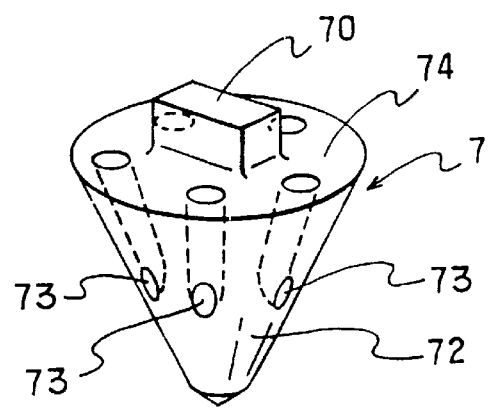
FIG.4-B

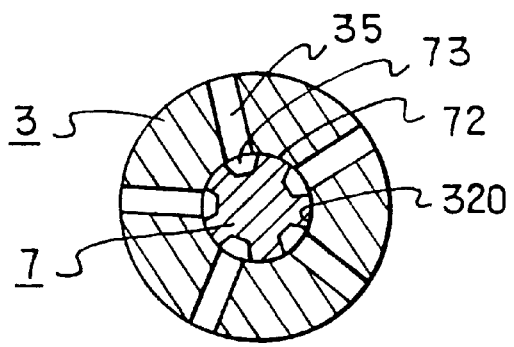
FIG.5-A
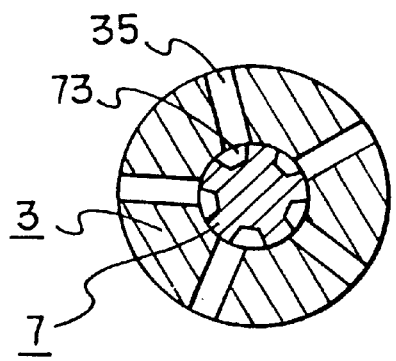
FIG.5-B
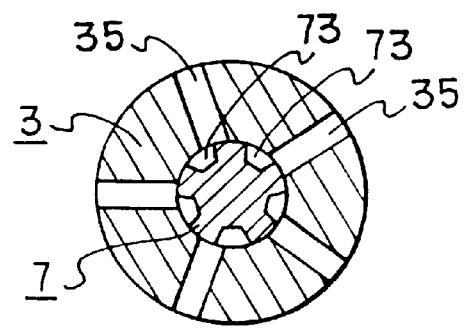
FIG.5-C
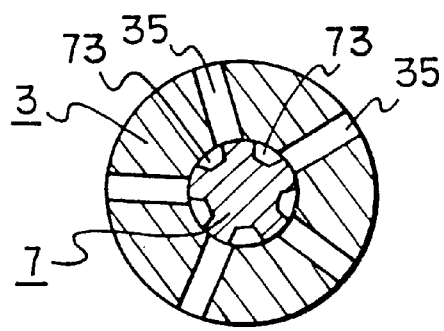
FIG.5-D

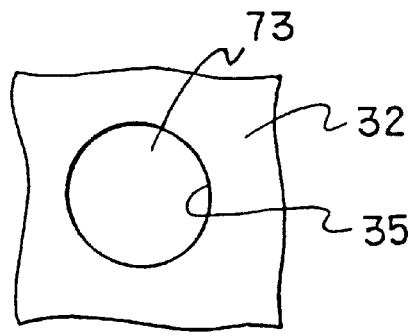
FIG.6-A
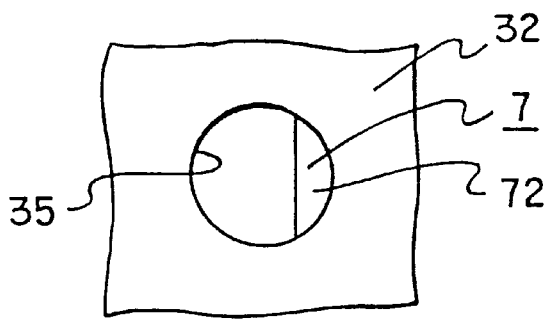
FIG.6-B
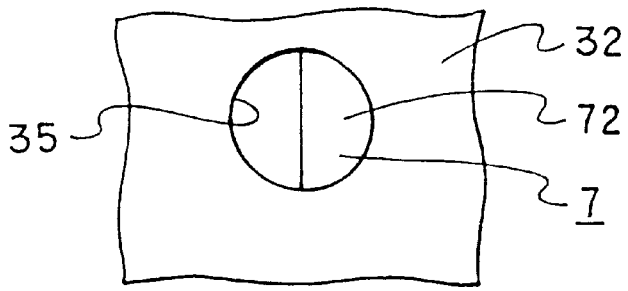
FIG.6-C
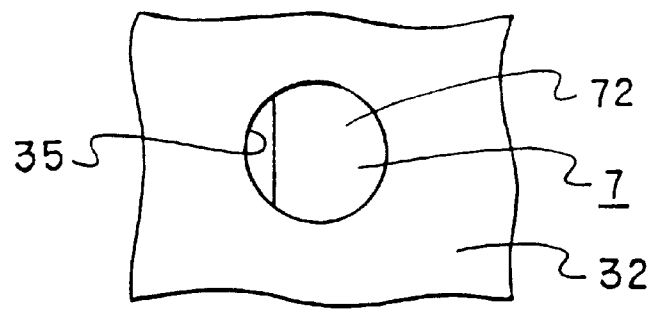
FIG.6-D

FIG.8-A
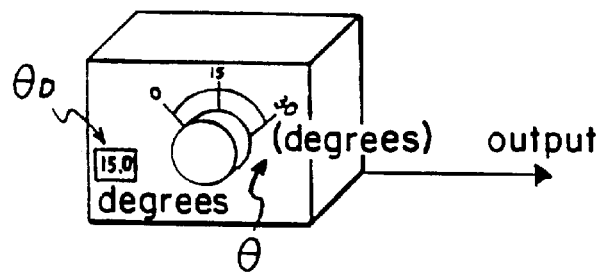
FIG.8-B
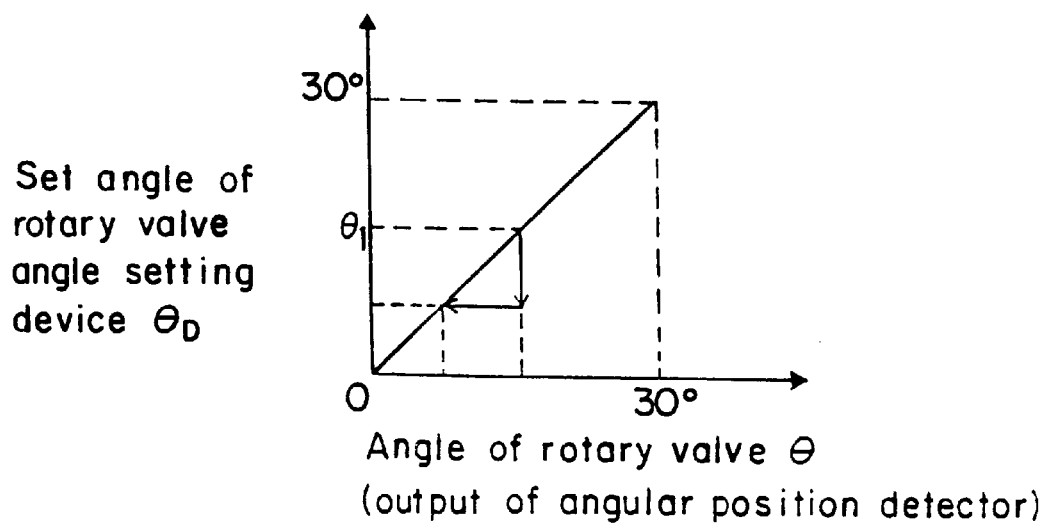
FIG.9
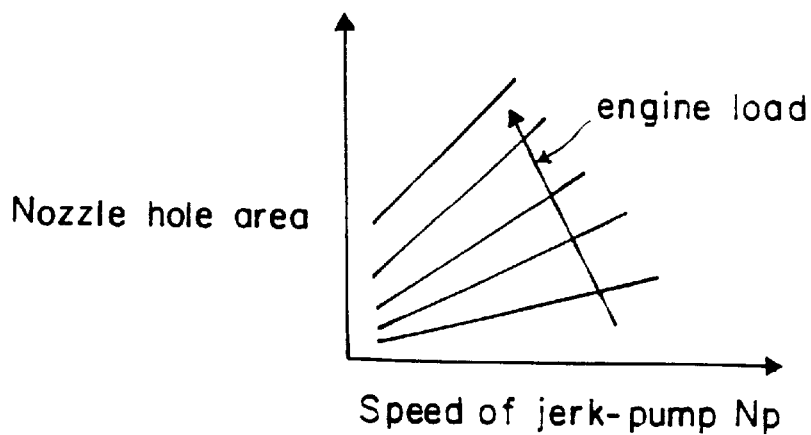

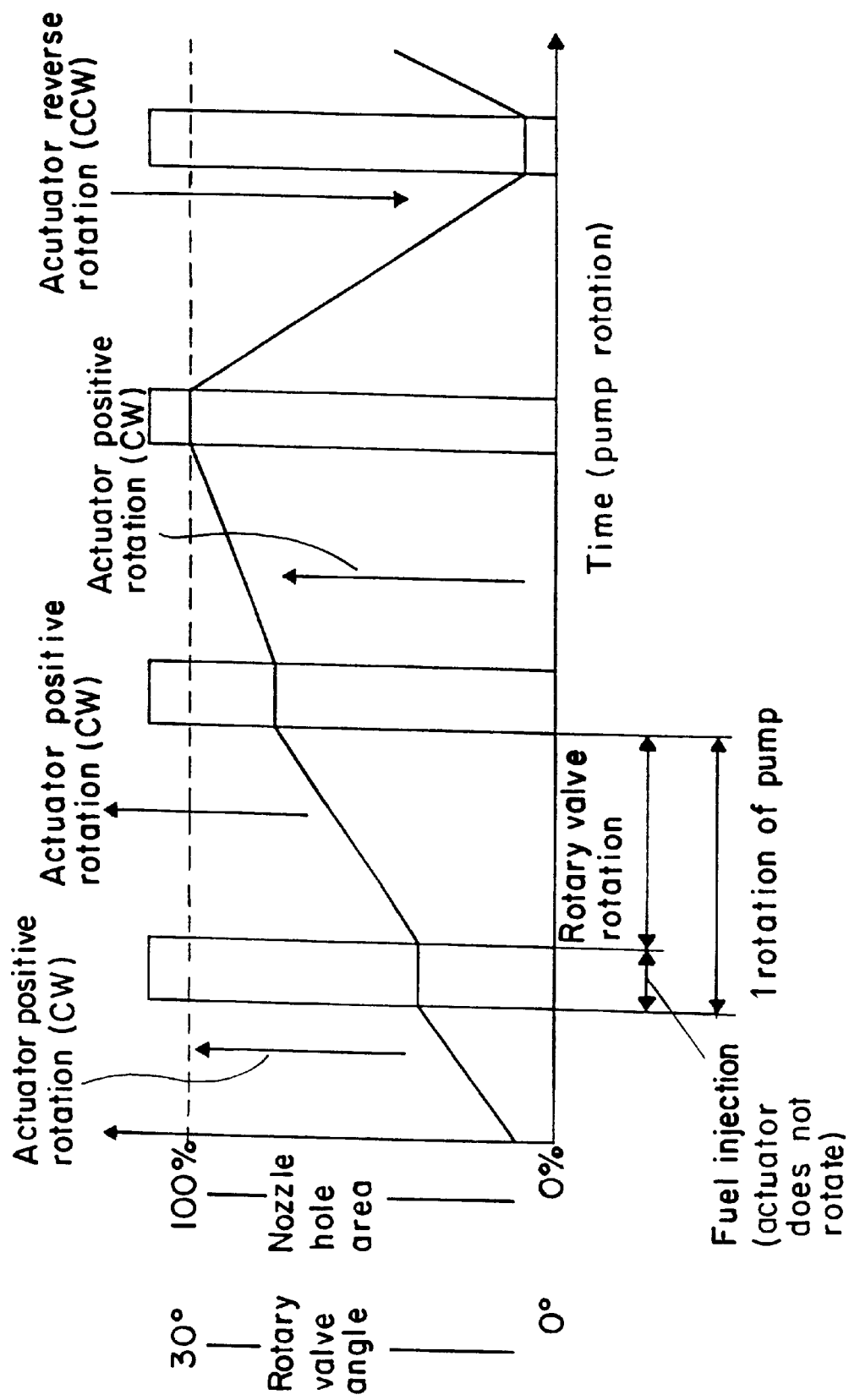

FUEL INJECTION CONTROL METHOD USING VARIABLE NOZZLE HOLE FUEL INJECTION NOZZLE

FIELD OF THE INVENTION

This invention relates to a fuel injection control method used in a diesel engine or the like, and particularly to a fuel injection control method using a variable nozzle hole fuel injection nozzle.

BACKGROUND OF THE INVENTION

A fuel injection system in a diesel engine is generally made up of a jerk type fuel injection pump such as a distributor pump or an in-line pump and fuel injection nozzles.

The fuel injection nozzles are means for supplying fuel in an atomized state to the cylinders of the engine, and as disclosed for example in Japanese Unexamined Patent Publication No. S.59-180063 may have a construction wherein a needle valve is received in a nozzle body slidably in the axial direction of the needle valve and the nozzle body and this needle valve is urged closed from the axial direction rear thereof by a spring and the needle valve has a conical pressure-receiving surface at its tip and by a fuel pressure sent out from a jerk type fuel injection pump being made to act on this pressure-receiving surface the needle valve is opened and fuel is injected into a combustion chamber of the engine through a plurality of nozzle holes formed in the tip of the nozzle body.

However, with this construction, the fuel injection pressure, the injected amount and the injection speed are generally determined by the characteristics and the capacity of the jerk type fuel injection pump, and furthermore it is not possible to finely increase or decrease the total nozzle hole area. Consequently, during low-speed running of the engine the fuel injection pressure decreases and during low-load running of the engine the injection time becomes short and it is not possible to maintain a good combustion state, and it has been difficult to promote fuel combustion and achieve improvements in output and fuel consumption and reductions in combustion noise and NOx emissions.

As a measure to overcome this, in Japanese Unexamined Patent Publication No. H.4-76266, a fuel injection nozzle having a variable nozzle hole area has been proposed. In this related art, a plurality of nozzle holes are formed spaced in the circumferential direction in a wall bounding a well formed in the tip of the nozzle body and a rotatable shaft to serve as a rotary valve is passed through the center of the needle valve and has its tip positioned in the well. Passages are provided in the tip of the rotary valve shaft and a fuel pressure chamber in the well and the nozzle holes are connected by these passages when the needle valve opens.

However, this related art only provides control setting the rotary valve to a position such that four nozzle holes are open at times of low-speed and low-load running of the engine and switching the position of the rotary valve to a position such that eight nozzle holes are used at times of high-speed/high-load running; that is, the method merely consists of switching the number of open nozzle holes between four and eight and does not allow the nozzle hole area to be finely adjusted to a nozzle hole area optimal to the running state of the engine. Also, there is the problem that when the number of open nozzle holes is switched, the spray direction also changes.

Furthermore, in this related art, there is no disclosure relating to how to control the rotary valve to obtain an optimum nozzle hole area. In particular, when a variable nozzle hole type fuel injection nozzle is combined with a jerk type fuel injection pump, to optimize the nozzle hole area it is necessary to control the angle of the rotary valve taking into account the speed of the jerk type fuel injection pump, the responsiveness and rotating torque of an actuator rotating the rotary valve, and because in the related art there has been no disclosure providing means or methods for solving these problems this kind of pump-nozzle combination has up to now been lacking in practicality.

SUMMARY OF THE INVENTION

It is therefore an object of the invention to provide a fuel injection control method with which it is possible to control the nozzle hole area optimally at all speeds of the jerk type fuel injection pump and irrespective of the responsiveness and the rotating torque of the actuator for rotating the rotary valve and it is thereby possible to surely form a spray having characteristics optimal for engine combustion.

It is another object of the invention to provide a fuel injection control method with which a required nozzle hole area can be obtained automatically over the entire speed range of the jerk type fuel injection pump even using a small rotary valve actuator having slow responsiveness.

To achieve the above-mentioned objects and other objects, the invention provides a fuel injection control method using a variable nozzle hole type fuel injection nozzle of a type having on the entrance side of a well formed in the tip of a nozzle body a needle valve opened by a fuel pressure from a jerk type fuel injection pump and having provided spaced in the circumferential direction in a well enclosing wall forming the well a plurality of nozzle holes and having disposed in the well a rotary valve having fuel passages connectable with the nozzle holes, the rotary valve being rotated by an actuator and the degree of connection of the nozzle holes with the fuel passages being changed with the angle of the rotary valve.

According to the invention, in carrying out fuel injection using this variable nozzle hole type fuel injection nozzle in combination with a jerk type fuel injection pump, a non-injection period in the rotation of the jerk type fuel injection pump is detected and the angle of the rotary valve is changed in steps until the rotary valve reaches a target angle corresponding to a required nozzle hole area by an operation of driving the actuator to rotate the rotary valve only in this non-injection period being repeated a required number of times.

In accordance with the invention, this is preferably done using the control steps of:

(i) determining a target pulse count and a rotation direction of the actuator in correspondence with a difference between the target angle of the rotary valve corresponding to the required nozzle hole area and a present absolute angle of the rotary valve;

(ii) using as an injection end index pulse a divisional pulse (360 or 3600 pulses/rev.) uniformly dividing with respect to time a one-per-rotation reference pulse (1 pulse/rev.) indicating the start of an injection in each rotation of the jerk type fuel injection pump and when the divisional pulse reaches a predetermined pulse count (delay pulse count ID) indicating that the injection has ended with this timing driving the actuator to rotate the rotary valve by no more than a maximum operating pulse count constituting a maximum number of pulses by which the actuator can be driven in an actuator-operable region between injections; and (iii) when the angle obtained in the present rotation falls short of the target angle to which the target pulse count corresponds driving the actuator to rotate the rotary valve by no more than the maximum operating pulse count in at least one subsequent rotation of the jerk type fuel injection pump with the same timing and thereby attaining the target angle of the rotary valve corresponding to the required nozzle hole area.

Explaining the invention in more detail, when carrying out fuel injection using a variable nozzle hole type fuel injection nozzle having a rotary valve combined with a jerk type fuel injection pump, to respond to the demands of the engine it is desirable to increase the nozzle hole area with increases in the speed of the jerk type fuel injection pump and decrease the nozzle hole area correspondingly when the speed of the jerk type fuel injection pump falls.

As a method for executing this kind of control, rotating the rotary valve during fuel injections through the injection nozzle is conceivable. However, in this case, when the rotating torque of the actuator is lower than a position-holding force exerted on the rotary valve by the fuel injection pressure, the rotary valve does not move and consequently the required nozzle hole area cannot be obtained. To solve this it is necessary to use an actuator from which a large rotating torque can be obtained. However, if this is done, the actuator becomes large and consequently the injection nozzle on which the actuator is mounted becomes large and very high-cost.

Also, when the engine and the jerk type fuel injection pump are being run at high speed, it becomes difficult to operate the actuator to move the rotary valve to a target angle within a single rotation of the jerk type fuel injection pump, and control of the actuator overlaps with the fuel injection period and the problem mentioned above arises again. This is particularly marked when an actuator having a slow responsiveness is used.

To overcome this, in the present invention, a basic control approach of operating the actuator and thereby rotating the rotary valve only between fuel injections is employed. Also, when the engine and the jerk type fuel injection pump are running at high speed, the required correct nozzle hole area is obtained by rotating the rotary valve in steps until the rotary valve angle corresponding to the target nozzle hole area is reached.

To achieve this, the invention neatly utilizes to advantage the characteristics of the jerk type fuel injection pump. That is, in a jerk type fuel injection pump the timing of the injection in each rotation of the pump is determined by the shape of a cam, and the angular position of the cam at this injection timing is the same at all speeds of the pump. Accordingly, in this invention, a one-per-rotation injection reference pulse is obtained from speed detecting means of the jerk type fuel injection pump and a divisional pulse dividing this injection reference pulse into many equal intervals with respect to time is also obtained. If this is done, it is possible to detect automatically after a fixed number of pulses of the divisional pulse that the needle valve of the injection nozzle opens and fuel injection is carried out.

The duration of this fuel injection depends on the type of the jerk type fuel injection pump, but normally is a maximum of about 20° in the 360° of each rotation (although due to pre-stroke the phase may shift by a maximum of about 40°). Thus, by counting from the divisional pulse a delay pulse count corresponding to the duration of the fuel injection, it is possible to set an actuator drive timing for adjusting the nozzle hole area.

Accordingly, in the invention, a desired nozzle hole area is set and a target angle of the rotary valve calculated from the correlation between the nozzle hole area and the angle of the rotary valve is converted into a target pulse count and the actuator is operated with the above-mentioned timing until it reaches that target pulse count. When the target pulse count is not reached in one rotation of the jerk type fuel injection pump, control is carried out to operate the actuator with the same timing (i.e. during non-injection) in one or more subsequent rotations of the jerk type fuel injection pump until the target pulse count (and hence the target nozzle hole area) is attained.

In this way, with the present invention, the nozzle hole area can be precisely changed to a target size not while fuel injection from the injection nozzle is in progress but rather using the non-injection period between fuel injections and so that rotation operation of the actuator is kept exclusively to an actuator-operable region. Because of this, even using an actuator having a slow responsiveness, it is possible to realize any optimal nozzle hole area change over the entire speed range of the jerk type fuel injection pump. As a result, it is possible to carry out optimal fuel injection so that the injection pressure, the injection period and the injected amount are matched to the speed and load of the engine. And because the responsiveness of the actuator can be slow the need to use a large or special actuator can be avoided and the injection nozzle can be made compact and low-cost.

BRIEF DESCRIPTION OF THE DRAWINGS

FIG. 2-A is an enlarged view of a portion of FIG. 1 showing the state of the fuel injection nozzle before an injection;

FIG. 2-B is an enlarged view of a portion of FIG. 1 showing the state of the fuel injection nozzle during an injection;

FIG. 3-A is a sectional view on the line X—X of FIG. 2-A;

FIG. 3-B is a sectional view on the line Y—Y of FIG. 2-A;

FIG. 4-A is a perspective view showing an example of a rotary valve used in the invention and its relationship with a coupling piece and a shaft;

FIG. 4-B is a perspective view showing another example of a rotary valve used in the invention;

FIG. 5-A is a sectional view illustrating the relationship between the angular position of a rotary valve and nozzle holes in the invention and showing an open hole area at 100%;

FIG. 5-B is a similar sectional view showing the open hole area at 75%;

FIG. 5-C is a similar sectional view showing the open hole area at 50%;

FIG. 5-D is a similar sectional view showing the open hole area at 25%;

FIG. 6-A is an enlarged front view of a nozzle hole as of when the open hole area is 100%;

FIG. 6-B is an enlarged front view of the nozzle hole as of when the open hole area is 75%;

FIG. 6-C is an enlarged front view of the nozzle hole as of when the open hole area is 50%;

FIG. 6-D is an enlarged front view of the nozzle hole as of when the open hole area is 25%;

FIG. 8-A is a perspective view showing an example of a rotary valve angle setting device;

FIG. 8-B is a graph showing a relationship between the angle of a rotary valve and a set angle;

FIG. 9 is a graph showing a relationship between the speed of a jerk type fuel injection pump, engine load and optimum nozzle hole area;

FIG. 12 is a graph showing a relationship between step control of a rotary valve and nozzle hole area change.

Other features and advantages of the invention will be made apparent by the following detailed description of a presently preferred embodiment thereof; however, the invention is not limited to the construction shown in the preferred embodiment and it will be clear to those skilled in the art that various changes and modifications are possible within the spirit and scope of the invention.

DETAILED DESCRIPTION OF THE PREFERRED EMBODIMENTS

Figure 1:
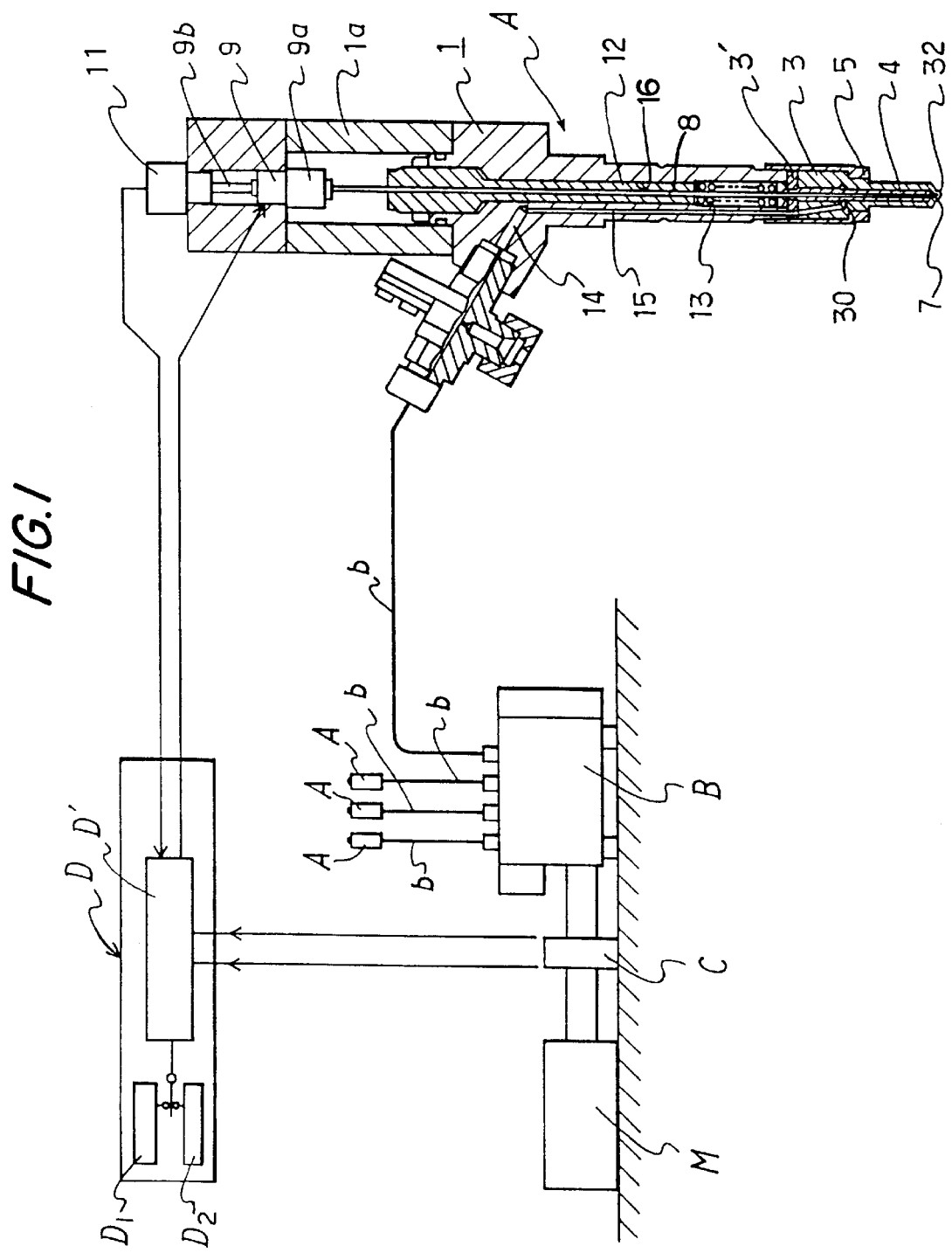
FIG. 1 is a view showing an example of a fuel injection nozzle and a control system used in a fuel injection control method according to the invention.

FIG. 1 is a schematic view of a system used in a fuel injection control method according to the invention. The reference numeral A denotes a variable nozzle hole type fuel injection nozzle, and this fuel injection nozzle is mounted projecting into a combustion chamber of a diesel engine. Here, one variable nozzle hole type fuel injection nozzle A is shown representatively, but of course a number corresponding to the number of cylinders in the engine are used. The reference numeral B denotes a jerk type fuel injection pump. A jerk type fuel injection pump is a pump such as an in-line type pump or a distributor type pump having a cam rotated by a camshaft and plungers driven by this cam.

An example of specifications of a distributor type pump to which the invention can be applied is a type having a maximum speed of 2000 rpm, a maximum fuel injection duration of 20° (1.67 msec at 2000 rpm) in the 360° of one rotation, and a maximum injection phase shift due to pre-stroke variation of about 40°.

The reference numeral M denotes a motor for driving the jerk type fuel injection pump B.

C denotes speed detecting means (hereinafter called an encoder) provided in the vicinity of a main shaft of the jerk type fuel injection pump B; this may be of any type such as magnetic or optical type, but whatever its type an encoder having the capability of outputting a 1-pulse signal (1 pulse/rev.) for every rotation of the camshaft of the jerk type fuel injection pump B is used. The timing at which this signal is generated is made to correspond with a cam phase position of immediately before the start of fuel injection. Also, for this encoder C an encoder having the capability of outputting a divisional pulse dividing the 1-pulse signal into for example 360 or 3600 equal intervals per rotation (360 pulse/rev. or 3600 pulse/rev.) as well as outputting the 1-pulse signal showing the start of fuel injection of every rotation is used.

D is a controller for rotary valve drive control.

The variable nozzle hole type fuel injection nozzle A not only has a needle valve 4 opened by fuel pressure like known fuel injection nozzles but in particular has a rotary valve 7 and a drive system including an actuator 9 for driving this rotary valve 7 and a detector 11 for detecting the absolute angle (absolute angular position) of the rotary valve 7.

FIG. 1 through FIG. 5-D show an example of a variable nozzle hole type fuel injection nozzle A which can be used with the invention.

In FIG. 1, a nozzle holder proper 1 has a driving head part 1a oiltightly fitted to its upper end. A nozzle body 3 is connected to the lower end of the nozzle holder proper 1 with a spacer 3' therebetween, and this nozzle body 3 is joined to the nozzle holder proper 1 by means of a retaining nut 5. The needle valve (nozzle needle) 4 is inserted into the inside of the nozzle body 3.

An axial hole 16 is provided in the center of the nozzle holder proper 1 and a nozzle spring 13 is disposed in a lower section of this axial hole 16 and is supported by a pushing member 12 inserted into the axial hole 16 from above.

The nozzle body 3 has a tubular part extending from a step part fitting in the retaining nut 5 and has at the end of this a tip part in which are formed nozzle holes.

In the center of the nozzle body 3, from the upper end toward the lower end thereof, are formed a guide hole concentric with the axial hole 16 in the nozzle holder proper 1 and below that a fuel reservoir 30.

Below the fuel reservoir 30, as shown in FIG. 2-A, the nozzle body 3 has an annular fuel feed hole 300 formed between itself and the needle valve 4, and at the lower end of this fuel feed hole 300 has a conical seat surface 33 and below this seat surface 33 has a bottomed well 31 into which pressurized fuel is guided through the fuel feed hole 300. The well 31 is formed by an enclosing wall 32 of the tip part of the nozzle body 3.

As shown in FIG. 1, a pressurized fuel opening 14 is provided in one side of the nozzle holder proper 1; a delivery valve (not shown) of the jerk type fuel injection pump B is connected to the pressurized fuel opening 14 by a pipe b, and pressurized fuel from the jerk type fuel injection pump B is guided to the fuel reservoir 30 through a passage hole 15 provided in the nozzle holder proper 1 and the nozzle body 3.

The needle valve 4 has a member supporting the nozzle spring 13 engaged with its upper end, as in known fuel injection nozzles. A guide part which makes sliding contact with the guide hole and a pressure-receiving part for receiving the fuel pressure inside the fuel reservoir 30 are provided on an outer circumferential periphery of the needle valve 4. A shaft part 43 for forming an annular fuel passage A between itself and the fuel feed hole 300 wall is provided below this pressure-receiving part, as shown in FIG. 2-A, and a conical seat surface 44 for coming in and out of contact with the above-mentioned seat surface 33 is formed on the lower end of this shaft part 43.

A conical surface 320 smoothly continuous with the seat surface 33 is formed on the inner side of the enclosing wall 32 bounding the well 31.

As shown in FIG. 3-A and FIG. 3-B, a plurality of nozzle holes 35 connecting with the inside of the well 31 are formed with a uniform circumferential spacing in the enclosing wall 32 having the conical surface 320. In this preferred embodiment there are five nozzle holes 35 extending radially with a circumferential spacing of 72°.

As shown in FIG. 2-A, the needle valve 4 has in its center an axial direction hole 41 and a stepped hole 42 is formed at the lower end of the axial direction hole 41 and opens at the lower end of the needle valve 4.

A rotary valve 7 is disposed in the well 31. A drive arrangement of the rotary valve 7 is in this example made up of a coupling piece 10, a shaft 8, and the above-mentioned actuator 9 which is mounted on the driving head part 1a, and by the actuator 9 being driven a rotating torque is transmitted to the rotary valve 7 through the shaft 8 and the coupling piece 10 and the rotary valve 7 is thereby rotated in the well about the nozzle axis.

The coupling piece 10 is for transmitting rotating torque to the rotary valve 7 while allowing axial direction play of the rotary valve 7 caused by lifting of the needle valve 4, and an Oldham coupling or a similar type of coupling is used.

As shown in FIG. 2-A, FIG. 2-B and FIG. 4-A, the coupling piece 10 has a cylindrical portion 10a of a diameter such that it fits loosely in the stepped hole 42 of the needle valve 4, and a groove 10b is formed in the lower end of this cylindrical portion 10a. A short shaft portion 10d extends from a conical portion 10c formed at the upper end of the cylindrical portion 10a of the coupling piece 10, a projecting piece 10e is formed on the upper end of this short shaft portion 10d, the projecting piece 10e engages with a groove 80 provided in the lower end of the shaft 8 slidably with respect thereto and transmits torque.

The stepped hole 42 of the needle valve 4 has a hole in which the short shaft portion 10d fits, a conical part 42c facing the conical portion 10c, and a hole in which the cylindrical portion 10a fits.

The shaft 8 extends from the needle valve 4 and passes all the way through the nozzle holder proper 1. That is, as shown in FIG. 2-A, the shaft 8 has a length such that it reaches the lower end of the axial direction hole 41 in the needle valve 4 and is connected by the groove 80 in its lower end to the coupling piece 10. The shaft 8 also passes through a hole in the spacer 3' and extends upward through the axial hole in the nozzle holder proper 1 and is connected to a speed reducer 9a of the actuator 9, for example a gear type speed reducer having a predetermined speed reduction ratio.

The actuator 9 may be any pulse-controllable reversible motor, and typically a stepping motor or a servo motor is used. This actuator 9 is electrically connected to the controller D and driven by a driving pulse signal therefrom.

A specific example of the actuator 9 is a stepping motor of driving type: bipolar, excitation type: 2-phase excitation, coil resistance: 18 Ohms, inductance: 4 mH, driving frequency: 500 pulse/sec or 1000 pulse/sec, angle of one step: 18° (to be geared down to 1.2°), and rotating/holding torque: about 15 mNm. The external diameter of this motor is about 10 mm.

An example of the rotary valve 7 is shown in FIG. 4-A, and FIG. 1 through FIG. 3-B show this example in use.

The rotary valve 7 has at its upper end a flat pressure-receiving surface 74 on which the pressure of pressurized fuel acts when the needle valve 4 is open. A projecting piece 70 is formed integrally in the approximate middle of this pressure-receiving surface 74, and this projecting piece 70 is fitted in the groove 10b formed in the coupling piece 10 axially slidably with respect to the coupling piece 10.

In this example, the rotary valve 7 has extending downward from the periphery of the pressure-receiving surface 74 a conical surface 72 tapering at an angle matching that of the conical surface 320 of the well enclosing wall 32, and the rotary valve 7 is frictionally seated by the contact between this conical surface 72 and the conical surface 320 of the well enclosing wall.

The radius of the pressure-receiving surface 74 of the rotary valve 7, the lower end radius of the conical surface 72 and the inclination angle of the conical surfaces with respect to the nozzle axis are so set that a rotating torque $T_1$ (Nm) due to pressurized fuel and a holding torque $T_2$ (Nm) are in the relationship $T_1 < T_2$. The inclination angle of the conical surface 320 of the well 31 and the conical surface 72 of the rotary valve 7 generally selected from the range of 50 to 70°, and the radius of the pressure-receiving surface 74 and the lower end radius of the conical surface 72 are set with this as a reference. Because the rotary valve 7 of this example is held in position by a frictional force between the conical surface 72 and the conical surface 320 arising due to a pressurized fuel pressure acting on the pressure-receiving surface 74, the actuator 9 need only apply a small torque sufficient to overcome the difference $\Delta T$ between the holding torque $T_2$ on the rotary valve and the torque $T_1$ tending to rotate the rotary valve. Therefore, if this rotary valve 7 is used, a small and low-torque actuator can be used for the actuator 9 and as a result there is the advantage that it is possible to avoid making the injection nozzle large and facilitate its disposition and mounting with respect to the engine.

A plurality of fuel passages 73 are provided spaced in the circumferential direction in this rotary valve 7. The fuel passages 73 have one end opening at the pressure-receiving surface 74 and the other end connectable with the nozzle holes 35 at the conical surface 320.

In the example shown in FIG. 4-A, the fuel passages 73 are five channels, the same number as there are nozzle holes 35, and each of these channels has a dimension in a section perpendicular to its axis at least equal to the diameter of the nozzle holes 35, as shown in FIG. 3-A and FIG. 3-B, and terminates at a level approximately immediately below the nozzle holes 35, as shown in FIG. 2-A and FIG. 2-B.

FIG. 4-B shows another example of the rotary valve 7. In this example, the fuel passages 73 are not channels but holes, each having one end open at the pressure-receiving surface 74 and the other end open at the conical surface 72. These fuel passages 73 may each be a separate hole, but they do not have to be and for example holes opening at the conical surface 72 may be connected together by a common hole at their inner ends and holes then formed from the pressure-receiving surface 74 to the common hole. In any case, the portions of the conical surface 72 between the channels or holes act as covering parts for covering the nozzle holes 35.

FIG. 5-A through FIG. 5-D and FIG. 6-A through FIG. 6-D show an example of the relationship between the angular position of the rotary valve 7 and the nozzle hole area (and nozzle hole shape). FIG. 5-A and FIG. 6-A show the fuel passages 73 of the rotary valve 7 completely connected with the nozzle holes 35 and the open hole area thus at 100%. FIG. 5-B and FIG. 6-B show a state wherein the rotary valve 7 has rotated and the conical surface 72 portions between the fuel passages 73 partially cover the nozzle holes 35 so that the nozzle hole area is 75%. FIG. 5-C and FIG. 6-C show a state wherein the rotary valve 7 has rotated further and the conical surface 72 portions between the fuel passages 73 have reached positions such that they cover a half of each of the nozzle holes 35 and the nozzle hole area is thus 50%. FIG. 5-D and FIG. 6-D show a state wherein the rotary valve 7 has rotated still further and the conical surface 72 portions between the fuel passages 73 cover a large part of each of the nozzle holes 35 and the nozzle hole area is 25%.

A fuel injection control method according to the invention can control the rotary valve 7 not only of course to any angular position (any nozzle hole area) between the positions shown in FIG. 5-A through FIG. 5-D and FIG. 6-A through FIG. 6-D but also as far as a state where in the nozzle holes 35 are completely covered by the conical surface 72 (nozzle hole area 0%).

In a specific example of specifications of the rotary valve 7 there are five nozzle holes and five fuel passages, the angle through which the rotary valve turns to bring the nozzle hole area from 0% to 100% is 30°, and the torque required to rotate it is about 15 mNm between fuel injections and about 200 mNm during a fuel injection.

The rotation direction of the rotary valve is forward rotation (CW) or reverse rotation (CCW), and when the rotary valve 7 is rotated in the forward direction (clockwise) the nozzle hole area state changes progressively from that of FIG. 5-D to that of FIG. 5-A and from that of FIG. 6-D to that of FIG. 6-A and when it is rotated in the reverse direction (counterclockwise) the nozzle hole area state changes progressively from that of FIG. 5-A to that of FIG. 5-D and from that of FIG. 6-A to that of FIG. 6-D.

The detector 11 detecting the absolute angle (absolute position) of the rotary valve 7 may be any suitable type detector such as a potentiometer, an encoder or a collimator. In the preferred embodiment shown in FIG. 1 a potentiometer is used, and this potentiometer is connected to an output shaft 9b extending from the opposite side of the actuator 9 from the main output shaft of the actuator 9. The output side of the detector 11 is electrically connected to the controller D and successively inputs detection signals indicating the absolute angle of the rotary valve 7 into the controller D.

In this preferred embodiment there are five nozzle holes 35 and five fuel passages 73, but of course the invention is not limited to this configuration and alternatively there may be three, four or six or more of each.

Also, the shape of the rotary valve 7 and the shape of the well enclosing wall by which it is received are not limited to those of the example described above. That is, the whole of the well enclosing wall does not necessarily have to have a conical surface and alternatively a straight cylindrical surface parallel with the nozzle axis may be formed from the end of the seat surface 33 to an intermediate level of the well enclosing wall and the conical surface 320 provided extending from the end of this straight cylindrical surface. In this case, the rotary valve 7 also has a straight cylindrical surface parallel with the nozzle axis extending from the same intermediate level and the seat surface 33 is formed extending from the end of this. Also, in some cases the rotary valve 7 may be cylindrical and the well enclosing wall also cylindrical, and this is also included in the invention.

Also, the drive arrangement of the rotary valve is not limited to the type described in this preferred embodiment, and alternatively for example a pinlike coupling may be interposed between the shaft 8 and the coupling piece 10.

Moving on now to the control system, the controller D includes an actuator control circuit D' and this actuator control circuit D' is switchable between an automatic control unit $D_1$ and a manual control unit $D_2$ each having a CPU.

The automatic control unit $D_1$ is mainly used when the engine is mounted in a car or the like, and the manual control unit $D_2$ is used for example when the jerk type fuel injection pump B and the variable nozzle hole type fuel injection nozzle A are being matched with an engine in a laboratory.

The following parameters are inputted into the automatic control unit $D_1$ and the manual control unit $D_2$ as variables: rotary valve angle, nozzle hole area, rotary valve origin reset, rotary valve origin return, actuator drive step (for example 18° per step geared down to 1.2°), a calibration curve of rotary valve angle vs. nozzle hole area, a calibration curve of rotary valve angle vs. output of absolute position detector, automatic running operating map input, automatic running execution, manual running execution, actuator voltage (for example 0 to 5V), actuator driving frequency, actuator rotation direction, power supply On/Off, switching between manual control and automatic control, and so on.

Figure 7:
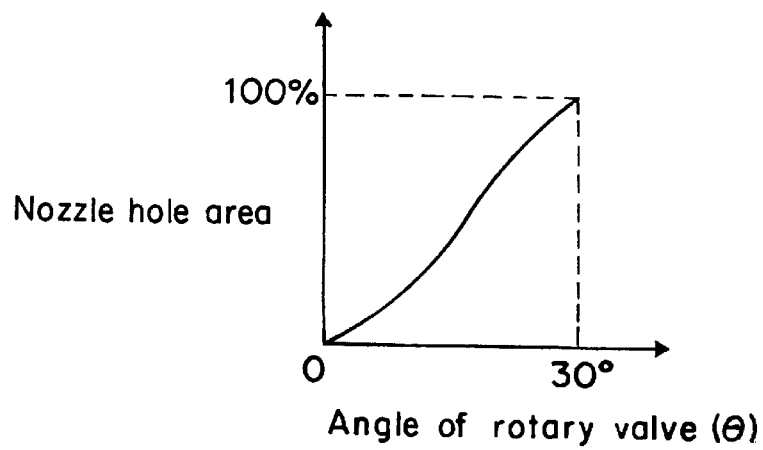
FIG. 7 is a graph showing a relationship between the angle of a rotary valve and nozzle hole area in the invention.

A calibration curve of rotary valve angle vs. nozzle hole area is shown in FIG. 7. As the angle of the rotary valve (the absolute angle detected by the detector 11) θ increases, the nozzle hole area increases. The target angle θD of the rotary valve in the case of manual control is set freely by means of a setting device of the kind shown in FIG. 8-A, and according to a calibration line of rotary valve angle θ vs. target angle θD of the kind shown in FIG. 8-B a deviation amount, that is, a rotation direction and a target actuator pulse count, is calculated in the actuator control circuit D'. The target angle θD is a post-rotation angular position of the rotary valve 7. That is, for example when a stepping motor is used as the actuator 9, the target angle θD is an angle from an origin at nozzle hole area 100% to be reached through a number of steps of the stepping motor. The target angle θD changes according to the engine load and the speed of the jerk type fuel injection pump; values thereof are inputted into a ROM or the like in advance, and the CPU issues a change command every time the engine load or the jerk type fuel injection pump speed changes.

As basic control data, as shown in FIG. 9, data correlating the speed Np (rpm) of the jerk type fuel injection pump with optimum nozzle hole area and engine load is also stored in a ROM of the actuator control circuit D', and the target angle θD of the rotary valve is determined on the basis of the content of this correlation data.

Also, as set conditions for actuator control, a maximum actuator operating pulse count Imax, a target actuator pulse count Iob, a number of actuator operations Jn required to reach the target pulse count, a remaining pulse count Is, and a backlash pulse count IB are used. If the backlash of the overall train of gears and couplings and so on is written X°, these parameters can be expressed as follows:

Imax: for example when the driving frequency of the actuator is 1000 pps, Imax=60/Np.300/360×1000, and when the driving frequency of the actuator is 500 pps, Imax=60/Np.300/360×500

Jn: Jn=Iob/Imax

Is: Is=Iob−(Jn×Imax)

IB: IB=X/1.2

The remaining pulse count Is is an important parameter in the present invention, This remaining pulse count Is has significance when the actuator 9 cannot rotate the rotary valve 7 to the target angle θD in a single rotation of the jerk type fuel injection pump B. For example, when the speed of the jerk type fuel injection pump B is 2000 rpm, if the rotary valve 7 angle is to be set to 30° from 0° (nozzle hole area 0→100%), depending on the type of the actuator, the actuator 9 may not be able to rotate the rotary valve 7 to the target angle in the non-injection period of a single rotation of the jerk type fuel injection pump. In this invention, in this case the angle remaining because the rotary valve 7 could not be rotated all the way to the target angle θD in one rotation of the jerk type fuel injection pump is turned through by the rotary valve 7 in one or more subsequent rotations of the jerk type fuel injection pump, and the remaining pulse count Is means the number of actuator operating pulses by which the actuator is driven in the last of these rotations.

In the case of automatic control, these set conditions are calculated together with an actuator rotation direction in a computing part of the actuator control circuit D'. The backlash is measured in advance in the assembly state and inputted as an initial value. In the case of manual control, the set conditions are set manually.

Next, a fuel injection control method according to the invention will be described. First, the operation of the mechanical parts is as follows.

Pressurized fuel is sent from the jerk type fuel injection pump B through the pipe b to the pressurized fuel opening 14 and pushed into the fuel reservoir 30 through the passage hole 15, and from there passes down the fuel feed hole 300 and acts on the pressure-receiving surface of the needle valve 4 positioned in the fuel reservoir 30. When the fuel pressure reaches a pressure overcoming the force of the nozzle spring 13, the needle valve 4 is lifted and the seat surface 44 at the lower end of the needle valve 4 moves away from the seat surface 33 of the nozzle body 3 and the needle valve thus opens. If the fuel pressure subsequently falls, the urging force of the nozzle spring 13 pushes the needle valve 4 down and thereby closes the valve. This operation is the same as that of an ordinary injection nozzle.

FIG. 2-A and FIG. 3-A show the state before an injection. In this state the needle valve 4 is closed and because no fuel pressure is acting on its lower surface the coupling piece 10 descends and the lower surface of the cylindrical portion 10a makes contact with the pressure-receiving surface 74 of the rotary valve 7.

When a drive signal is then sent from the controller D by way of a driver to the actuator 9, a rotating torque of the actuator 9 is transmitted to the shaft 8 and this rotating torque is transmitted through the coupling piece 10 to the rotary valve 7 and the rotary valve 7 rotates in the well 31. The rotary valve 7 is then stopped in its new position by a drive stopping signal from the controller D to the actuator 9.

In the case of the rotary valve shape shown in this preferred embodiment, between fuel injections, i.e. when the nozzle is in the state shown in FIG. 2-A and FIG. 3-A, because no load is acting on the rotary valve 7 in the axial direction, the conical surface 72 is not making strong contact with the conical surface 320 of the well enclosing wall and therefore the rotary valve 7 is rotated to the required angle easily and smoothly with a small torque. When from this state the fuel pressure rises and the needle valve 4 opens, high-pressure fuel enters the well 31 and acts on the lower end face of the cylindrical portion 10a of the coupling piece 10 and consequently the coupling piece 10 is lifted and the upper end of the short shaft portion 10d abuts upon the lower end surface of the shaft 8 and the conical portion 10c seats on the conical seat part of the stepped hole 42 of the needle valve 4.

High-pressure fuel enters the well 31 while maintaining its high fuel injection pressure as a result of a sealing action of this seat part and passes through the fuel passages 73 opening at the pressure-receiving surface 74 of the rotary valve 7 and is injected through the nozzle holes 35. This is the state illustrated in FIG. 2-B and FIG. 3-B and any of the states shown in FIG. 5-A through FIG. 5-D and FIG. 6-A through FIG. 6-D.

At this injection time, a fuel injection pressure acts on the pressure-receiving surface 74 at the upper end of the rotary valve 7. As a result, the rotary valve 7 is pushed down in the axial direction and the conical surface 72 at its circumferential periphery strongly makes surface contact with the conical surface 320 of the well enclosing wall and forms a seal, and a frictional fixing force arises. This frictional fixing force is greater than a force tending to move the rotary valve 7 about its axis of rotation due to fuel pressure acting on the nozzle holes 35.

Thus the rotary valve 7 is firmly held in the position to which it was rotated by the actuator 9, and also the firm contact between the conical surface 72 and the conical surface 320 of the well enclosing wall prevents leakage of high-pressure fuel in the circumferential direction. Furthermore, by a frictional action of the conical portions 10c, 42c the coupling piece 10 also is itself independently prevented from rotating.

During rotation of the jerk type fuel injection pump B, a holding voltage is applied to the actuator 9 at all times.

Figure 10:
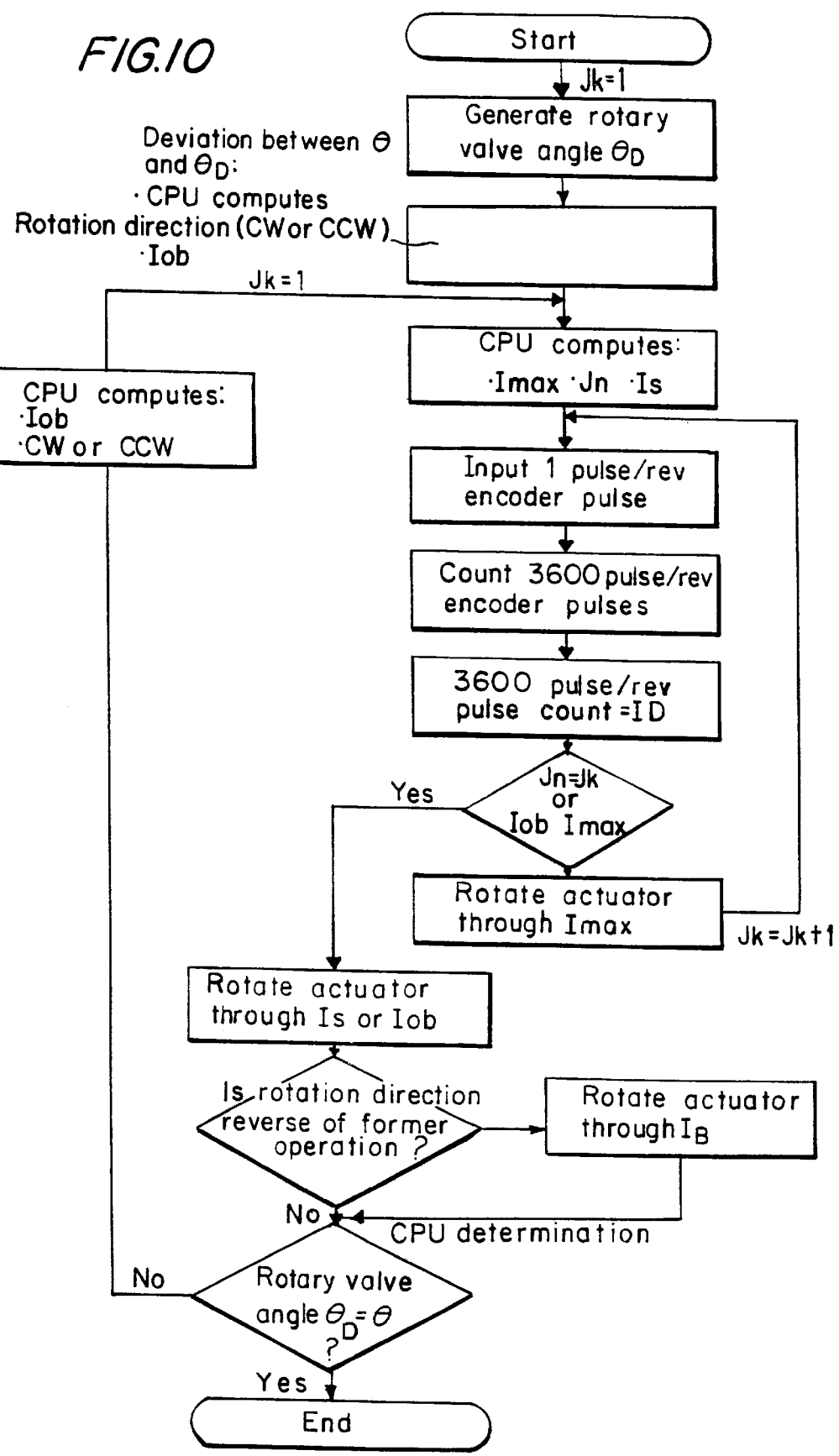
FIG. 10 is a flow chart showing an automatic control program according to the invention.

In injection control, either the automatic control unit $D_1$ or the manual control unit $D_2$ is selected. In the case of automatic control, nozzle hole control is carried out by the kind of program shown in FIG. 10.

Step 1:

Here, it is checked that at the present time an actuator control routine repetition count Jk is 1, and in this state a target angle θD of the rotary valve is set in correspondence with a desired nozzle hole area. For example when a stepping motor is used as the actuator 9, the target angle θD is an angle from an origin at nozzle hole area 100% to be reached through a number of steps of the stepping motor.

In the case of the automatic control unit $D_1$, since the relationship between the engine load and the speed of the jerk type fuel injection pump and the optimum nozzle hole area is prestored in a ROM, the target angle θD is determined by the CPU on the basis of this. That is, in practice, in the actuator control circuit D', on the basis of the content of the graphs of FIG. 7, FIG. 8-B and FIG. 9 prestored in the automatic control unit $D_1$ as maps, a target rotary valve angle θD based on change in the jerk type fuel injection pump speed and change in the engine load is automatically set.

Step 2:

When the target angle θD is set (generated), as step 2, in the actuator control circuit D' the deviation between the target rotary valve angle θD and the present absolute angle θ of the rotary valve is calculated by the CPU. Simultaneously with this, a rotation direction of the actuator 9, i.e. whether the actuator 9 is to be rotated in the forward direction (CW) or in the reverse direction (CCW) is determined. Also, according to the above-mentioned deviation and rotation direction, a target pulse count Iob of the actuator 9 is calculated. The absolute angle θ is for example an angle from an origin at nozzle hole area 100% defined in the CPU.

A maximum operating pulse count Imax of the actuator 9 is also calculated, and on the basis of this the number of actuator operations Jn needed to reach the target pulse count Iob is computed and from the maximum operating pulse count Imax and the target pulse count Iob and the number of actuator operations Jn needed to reach the target pulse count a remaining pulse count Is is also calculated using the above equation. Then, for example by a relay switch being switched, the rotation direction of the actuator 9 is mechanically switched to the direction determined as mentioned above.

Step 3:

When the settings of step 2 are ready, as step 3, a gate opens and a one-per-rotation reference pulse (1 pulse/rev.) signal indicating the start of fuel injection is inputted from the encoder C of the jerk type fuel injection pump B into the actuator control circuit D'. Simultaneously with that, a divisional pulse signal of for example 3600 pulse/rev. is also inputted. When this happens the number of divisional pulses inputted is counted and it is determined whether or not the divisional pulse count equals a fixed pulse count, namely a delay pulse count ID indicating that injection has ended.

When the delay pulse count ID is expressed as a cam angle of the jerk type fuel injection pump B, it is the same at all speeds of the jerk type fuel injection pump. However, the maximum injection period varies depending on the model of the jerk type fuel injection pump. In other words, the delay pulse count ID is a fixed value determined by the relative position of the encoder C when it is mounted to the main shaft of the jerk type fuel injection pump B. Therefore, after the encoder C is mounted to the main shaft, by any suitable method, for example by detecting the angle of the cam at which fuel injection starts with a micrometer and then detecting the encoder pulse and measuring the phase angle between the two and calculating it from this, the delay pulse count ID can be obtained. This delay pulse count ID is inputted into the actuator control circuit D'.

Step 4:

The divisional pulse count being determined to have reached the delay pulse count ID means that the fuel injection of this rotation of the jerk type fuel injection pump has ended. Accordingly, as step 4, it is determined by comparison in the actuator control circuit D' whether or not the number of actuator operations Jn and the actuator control routine repetition count Jk are equal. Or, instead of this, it is determined by comparison whether or not the maximum operating pulse count Imax is greater than the target pulse count Iob.

As a result, when Jn=Jk (or Imax>Iob), a signal of the target pulse count Iob set as described above (or a signal of the remaining pulse count Is) is sent from the actuator control circuit D' to the driving part of the actuator 9 as a driving signal.

Step 5:

The actuator 9 (and hence the shaft 8) then rotates until the target pulse count Iob (or the remaining pulse count Is) is reached, and the rotary valve 7 is thereby rotated in the well 31. At this time it is determined in the actuator control circuit D' whether or not the rotation direction of the rotary valve 7 is the same its the previous rotation direction. The angle of the actuator 9, that is, the absolute angle θ of the rotary valve 7, is detected by the rotary valve 7 and a corresponding angle signal is continuously inputted into the actuator control circuit D'.

The post-rotation angle attained by this driving of the actuator 9, i.e. the new absolute angle of the rotary valve 7, and the target angle θD are then compared, and if they are the same the driving of the actuator 9 is stopped and the rotary valve 7 is held in that position.

In this way the open area of the nozzle holes 35 is adjusted, and fuel injection is carried out with this nozzle hole area. This ends one basic control cycle.

The reason for determining in this step 5 whether or not the rotation direction of the rotary valve 7 is the same as its previous rotation direction is that backlash occurs when the rotation direction is the opposite of the previous time, and when the rotation direction is the opposite direction from the previous time a signal is sent to the actuator 9 and the actuator 9 is driven by the pulse count IB corresponding to the backlash.

When on the other hand the target angle θD and the absolute angle θ are not the same, a signal to that effect is sent to the actuator control circuit D' and in the CPU the target pulse count Iob is recalculated and the rotation direction to be used is redetermined and this data is sent to step 2 and the control described above is carried out again.

Figure 11:
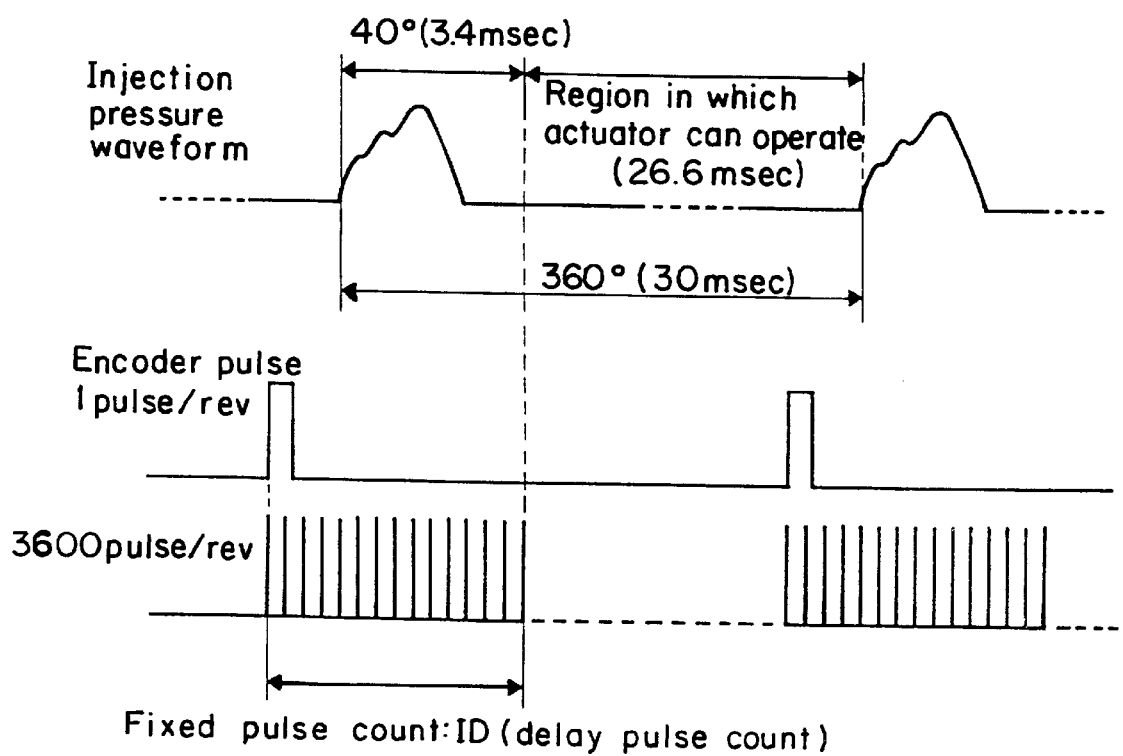
FIG. 11 is a view illustrating timing of nozzle hole adjustment in the invention.

The case of control carried out when the speed of the jerk type fuel injection pump is high will now be described in detail as a step 4'. When the speed of the jerk type fuel injection pump is for example 2000 rpm, if the injection time is assumed to be 40° (3.4 msec) as shown in FIG. 11, the region in which the actuator can be operated is 26.6 msec. Here, when the angle per step of the actuator is 1.2°, it may be impossible for the rotary valve to be brought to the target angle to reach the target nozzle hole area within a single non-injection period. This is because the number of pulses needed to do so exceeds the maximum actuator operating pulse count Imax. For example, when a 500 pulse/sec stepping motor is used as the actuator, one pulse is 1/500 seconds, or 2 msec. Now, to rotate the rotary valve through 30° requires 30°/1.20°=25 pulses. Therefore, the operating time required by a 500 pulse/sec stepping motor to rotate the rotary valve through 30° is 50 msec (2 msec×25 pulses), which is clearly longer than the 26.6 msec mentioned above.

It is for this reason that in this invention, in the above-mentioned step 4, the number of actuator operations Jn and the actuator control routine repetition count Jk are compared or it is determined whether or not the maximum actuator operating pulse count Imax is greater than the target pulse count Iob.

When this condition is not satisfied, i.e. when it is determined that the actuator cannot be driven by the target pulse count within the present non-injection period, in the present non-injection period the actuator 9 is driven by the maximum actuator operating pulse count Imax. As a result, the angle of the rotary valve 7 increases by an amount corresponding to the maximum actuator operating pulse count Imax and the nozzle hole area is for example increased from 20% to 27%.

At this time the actuator control routine repetition count Jk is assigned the value Jk=Jk+1 and fed back to the CPU, and processing returns to step 3. Then, when the divisional pulse based on the 1 pulse/rev. signal detected at the time of the next rotation of the jerk type fuel injection pump is counted and reaches the delay pulse count ID, i.e. when the end of the next injection is detected, it is again determined whether or not the number of actuator operations Jn=the actuator control routine repetition count Jk or whether the maximum actuator operating pulse count Imax>the target pulse count Iob and the actuator 9 is driven accordingly.

On this basis, the rotary valve is rotated again with the above-mentioned timing in the non-injection period following the injection just ended and the angle of the rotary valve 7 is thereby increased further and the nozzle hole area for example increases from 27% to 45%. By this kind of allocated rotation operation wherein the rotary valve is rotated (in a non-injection period) —stopped (for an injection)—rotated (in a non-injection period) being repeated one or more times, the rotary valve 7 is moved step by step to the target pulse count, i.e. to the target angle θD.

When the number of allocations reaches the target number (Jn=Jk), the program shifts to step 5 and the actuator 9 is driven in the next injection cycle by the remaining pulse count Is, and the resulting final absolute angle θ is compared with the target angle θD and if they are the same then control ends.

FIG. 12 shows schematically an example of the step by step control operation described above and shows a case wherein the actuator 9 is driven three times (Imax, Imax and Is) to bring the nozzle hole area to 100%.

Figure 13:
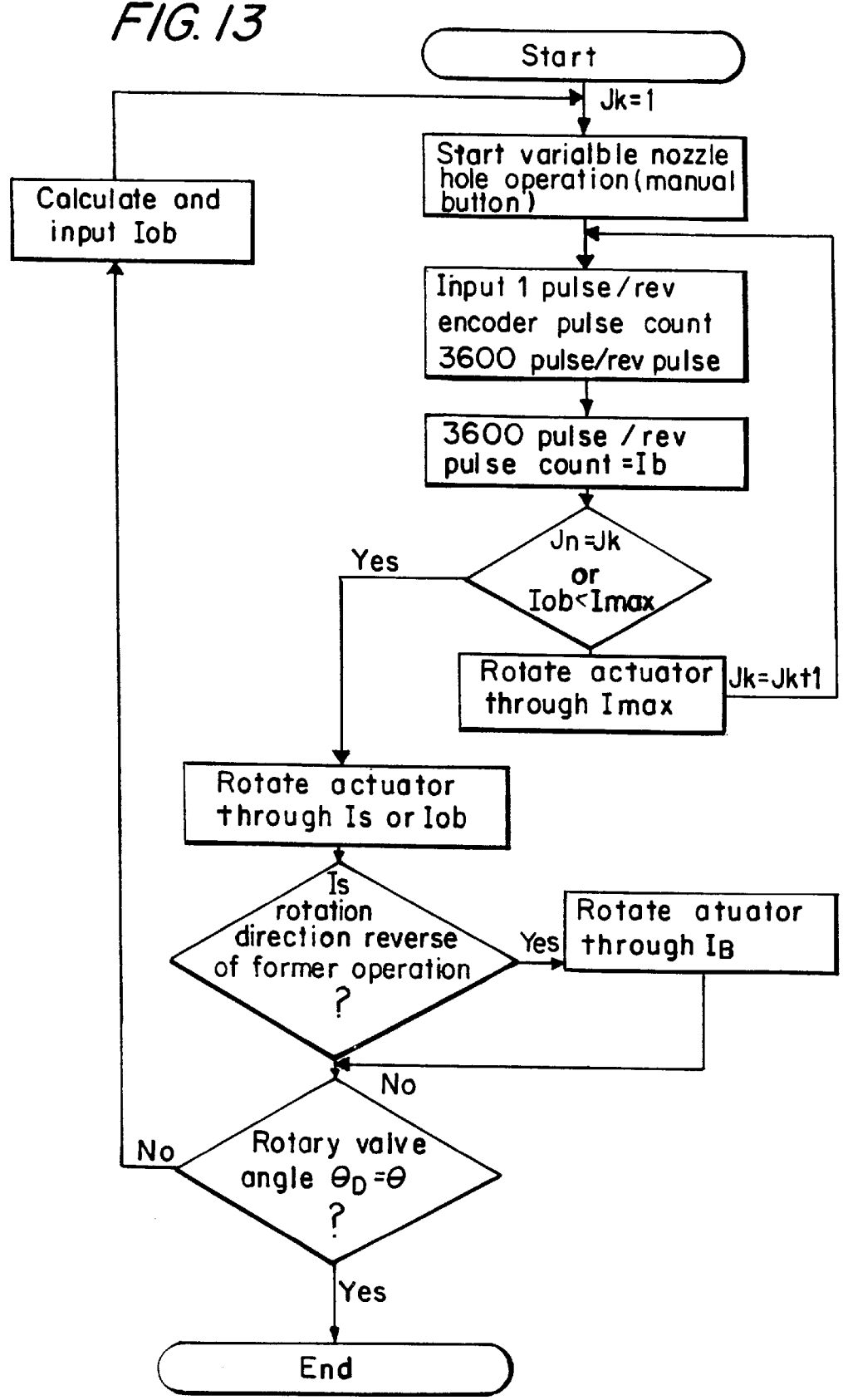
FIG. 13 is a flow chart of manual control according to the invention.

FIG. 13 shows an example of manual control. In this case, for example the kind of dial type device shown in FIG. 8-A is used to set a target angle θD in correspondence with a desired nozzle hole area. Also, Imax, Iob, Jn, Is and IB are calculated and manually inputted. Otherwise the content of the control is the same as that of the automatic control described above.

What is claimed is:

1. A method for carrying out fuel injection using a variable nozzle hole type fuel injection nozzle and a jerk type fuel injection pump, the variable nozzle hole type fuel injection nozzle being of a type having on the entrance side of a well (31) formed in the tip of a nozzle body a needle valve (4) opened by a fuel pressure from the jerk type fuel injection pump (B) and having provided spaced in the circumferential direction in a well enclosing wall forming the well a plurality of nozzle holes (35) and having disposed in the well a rotary valve (7) having fuel passages (73) connectable with the nozzle holes (35), the rotary valve (7) being rotated by an actuator (9) and the degree of connection of the nozzle holes (35) with the fuel passages (73) being changed in correspondence with the angle of the rotary valve (7), which method comprises detecting a non-injection period in the rotation of the jerk type fuel injection pump B and changing the angle of the rotary valve (7) in steps until the rotary valve (7) reaches a target angle (θD) corresponding to a required nozzle hole area by repeating a required number of times an operation of driving the actuator (9) to rotate the rotary valve (7) only in this non-injection period.

2. A method for carrying out fuel injection according to claim 1, comprising the control steps of:

(i) determining a target pulse count (Iob) and a rotation direction of the actuator (9) in correspondence with a difference between the target angle (θD) of the rotary valve (7) corresponding to the required nozzle hole area and a present absolute angle (θ) of the rotary valve;

(ii) using as an injection end index pulse a divisional pulse (360 or 3600 pulses/rev.) uniformly dividing with respect to time a one-per-rotation reference pulse (1 pulse/rev.) indicating the start of an injection in each rotation of the jerk type fuel injection pump (B) and when the divisional pulse reaches a predetermined pulse count (delay pulse count ID) indicating that the injection has ended with this timing driving the actuator (9) to rotate the rotary valve (7) by no more than a maximum operating pulse count (Imax) constituting a maximum number of pulses by which the actuator (9) can be driven in an actuator-operable region between injections; and (iii) when the angle (θ) obtained in the present rotation falls short of the target angle (θD) to which the target pulse count (Iob) corresponds driving the actuator (9) to rotate the rotary valve (7) by no more than the maximum operating pulse count (Imax) in at least one subsequent rotation of the jerk type fuel injection pump with the same timing and thereby attaining the target angle (θD) of the rotary valve corresponding to the required nozzle hole area.

3. A method for carrying out fuel injection according to claim 2, wherein the actuator (9) is connected to and driven by a signal from a controller (D) including a CPU and the divisional pulse (360 or 3600 pulses/rev.) uniformly dividing with respect to time a one-per-rotation reference pulse (1 pulse/rev.) indicating the start of an injection is detected by an encoder (C) of the jerk type fuel injection pump B and the present absolute angle (θ) of the rotary valve is detected by a detector (11) of the actuator (9) and the reference pulse and the divisional pulse are inputted into the controller (D) as signals and in the controller (D) at least the maximum operating pulse count (Imax) and the target pulse count (Iob) corresponding to the target angle (θD) and a number of actuator operations (Jn) needed to reach the target pulse count (Iob) and a remaining pulse count (Is) are calculated and set as parameters in association with the speed Np of the jerk type fuel injection pump B by a predetermined control program and the target angle (θD) of the rotary valve corresponding to the required nozzle hole area is attained by the actuator (9) being driven on the basis of these parameters.

4. A method for carrying out fuel injection according to claim 3, wherein the control program comprises the steps of:

(Step 1) confirming that an actuator control routine repetition count (Jk) is 1 and setting a target angle (θD) of the rotary valve in correspondence with a required nozzle hole area;

(Step 2) calculating a deviation between the target rotary valve angle (θD) and the present absolute angle (θ) and determining a rotation direction in which the actuator (9) is to be driven and calculating a target pulse count (Iob) of the actuator (9) in accordance with the deviation and the rotation direction and calculating a maximum operating pulse count (Imax) of the actuator (9) and on the basis of thereof calculating the number of actuator operations (Jn) needed to reach the target pulse count (Iob) and calculating a remaining pulse count (Is) from the maximum operating pulse count (Imax) and the target pulse count (Iob) and the number of actuator operations (Jn) needed to reach the target pulse count (Iob);

(Step 3) counting a divisional pulse (360 or 3600 pulses/rev.) uniformly dividing with respect to time a one-per-rotation reference pulse (1 pulse/rev.) indicating the start of an injection inputted from the encoder (C) and determining whether the divisional pulse count equals a fixed pulse count namely a delay pulse count ID indicating that the injection has ended;

(Step 4) determining by comparison whether the number of actuator operations (Jn) and the actuator control routine repetition count (Jk) are equal or whether the maximum operating pulse count (Imax) of the actuator (9) is greater than the target pulse count (Iob) and when Jn=Jk (or Imax>Iob) driving the actuator (9) by sending a signal of the set target pulse count (Iob) (or a signal of the remaining pulse count Is) to the actuator (9) as a drive signal and when the condition Jn=Jk (or Imax>Iob) is not satisfied shifting to Step 4' set forth hereinafter;

(Step 5) comparing the absolute angle (θ) inputted from the detector (11) with the target angle (θD) and if the two are equal sending a drive stopping signal to the actuator (9) to hold the position of the rotary valve (7) and if the target angle (θD) and the absolute angle (θ) are not equal recalculating the target pulse count (Iob) and redetermining the rotation direction and returning to Step 2; and (Step 4') when in Step 4 the condition Jn=Jk (or Imax>Iob) is not satisfied sending to the actuator (9) a signal driving the actuator (9) by the maximum operating pulse count (Imax) and thereby rotating the rotary valve (7) before the next injection and assigning to the control routine repetition count Jk the value Jk=Jk+1 and returning to Step 3.

5. A method for carrying out fuel injection according to claim 1, wherein the enclosing wall (32) of the well (31) in which the nozzle holes (35) are provided has a conical inner surface (320) and the rotary valve (7) has at its upper end a pressure-receiving surface (74) for receiving the pressure of pressurized fuel and has at its circumferential periphery a conical seat surface (72) of an angle matching the angle of the conical inner surface (320) and when a fuel injection pressure acts on the pressure-receiving surface (74) the conical inner surface (320) and the conical seat surface (72) come into frictional contact and the rotary valve is thereby held in position.

6. A method for carrying out fuel injection according to claim 1, wherein the actuator (9) is a pulse-controlled reversible motor and is mounted above the nozzle body and the output of the actuator (9) is transmitted to the rotary valve (7) through a shaft (8) and a coupling piece 10 connected to the shaft (8) axially slidably with respect thereto.

* * * * *